US012087049B2

(12) United States Patent
Yokoyama

(10) Patent No.: US 12,087,049 B2
(45) Date of Patent: Sep. 10, 2024

(54) INFORMATION PROCESSING DEVICE AND INFORMATION PROCESSING METHOD

(71) Applicant: SONY SEMICONDUCTOR SOLUTIONS CORPORATION, Kanagawa (JP)

(72) Inventor: Kyoji Yokoyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 139 days.

(21) Appl. No.: 17/631,555

(22) PCT Filed: Jul. 9, 2020

(86) PCT No.: PCT/JP2020/026784
§ 371 (c)(1),
(2) Date: Jan. 31, 2022

(87) PCT Pub. No.: WO2021/029167
PCT Pub. Date: Feb. 18, 2021

(65) Prior Publication Data
US 2022/0351505 A1 Nov. 3, 2022

(30) Foreign Application Priority Data
Aug. 13, 2019 (JP) ................. 2019-148676

(51) Int. Cl.
*G06T 7/90* (2017.01)
*G06T 1/00* (2006.01)
(Continued)

(52) U.S. Cl.
CPC .......... *G06V 10/955* (2022.01); *G06T 1/0021* (2013.01); *G06T 7/13* (2017.01);
(Continued)

(58) Field of Classification Search
CPC ...... G06V 10/955; G06V 10/70; G06V 10/44; G06V 2201/10; G06T 7/50; G06T 7/73;
(Continued)

(56) References Cited

U.S. PATENT DOCUMENTS 10,721,494 B2 * 7/2020 Kondo .................. H04N 19/96
11,019,407 B2 * 5/2021 Revital .............. H04N 21/8358
(Continued)

FOREIGN PATENT DOCUMENTS

CN 104243798 A 12/2014
JP 2000-196998 A 7/2000
(Continued)

OTHER PUBLICATIONS

International Search Report and Written Opinion of PCT Application No. PCT/JP2020/026784, issued on Oct. 13, 2020, 15 pages of ISRWO.

*Primary Examiner* — Shefali D Goradia
(74) *Attorney, Agent, or Firm* — CHIP LAW GROUP

(57) ABSTRACT

An information processing device and an information processing method capable of reducing an information processing amount of an application processor that recognizes a subject from an input image are provided. An information processing device according to the present disclosure includes an acquisition unit, a generation unit, and an output unit. From an imaging unit that captures an image and generates image data, the acquisition unit acquires the image data. The generation unit generates, from the image data acquired by the acquisition unit, metadata to assist an application processor that executes processing related to the image. The output unit outputs the metadata generated by the generation unit to the application processor.

12 Claims, 9 Drawing Sheets

(51) Int. Cl.
*G06T 7/13* (2017.01)
*G06T 7/50* (2017.01)
*G06T 7/73* (2017.01)
*G06V 10/44* (2022.01)
*G06V 10/70* (2022.01)
*G06V 10/94* (2022.01)
*H04N 23/66* (2023.01)

(52) U.S. Cl.
CPC .................. *G06T 7/50* (2017.01); *G06T 7/73* (2017.01); *G06T 7/90* (2017.01); *G06V 10/44* (2022.01); *G06V 10/70* (2022.01); *G06T 2201/005* (2013.01); *G06T 2207/10024* (2013.01); *G06T 2207/30201* (2013.01); *G06T 2207/30252* (2013.01); *G06V 2201/10* (2022.01); *H04N 23/66* (2023.01)

(58) Field of Classification Search
CPC .......... G06T 7/13; G06T 7/90; G06T 1/0021; G06T 2201/005; G06T 2207/10024; G06T 2207/30201; G06T 2207/30252; H04N 23/66

See application file for complete search history.

(56) References Cited

U.S. PATENT DOCUMENTS

| | | | |
|---|---|---|---|
| 11,336,796 B2* | 5/2022 | Tokumaru | ............. H04W 12/06 |
| 2014/0010450 A1* | 1/2014 | Suwa | ................... G06V 40/171 |
| | | | 382/173 |
| 2014/0368671 A1 | 12/2014 | Watanabe et al. | |
| 2017/0277863 A1* | 9/2017 | Subra | ................... G06Q 10/109 |

FOREIGN PATENT DOCUMENTS

| JP | 2002-359805 A | | 12/2002 |
|---|---|---|---|
| JP | 2004-112650 A | | 4/2004 |
| JP | 2014-016824 | * | 1/2014 |
| JP | 2014-016824 A | | 1/2014 |
| JP | 2015-002423 A | | 1/2015 |
| JP | 2018-190332 A | | 11/2018 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/026784 filed on Jul. 9, 2020, which claims priority benefit of Japanese Patent Application No. JP 2019-148676 filed in the Japan Patent Office on Aug. 13, 2019. Each of the above-referenced applications is hereby incorporated herein by reference in its entirety.

FIELD

The present disclosure relates to an information processing device, an information processing method, and an information processing program.

BACKGROUND

There is an image recognition device that recognizes a subject from an input image by using a neural network built by machine learning (see, for example, Patent Literature 1.). Such subject recognition is generally performed by an application processor for image recognition.

CITATION LIST

Patent Literature

Patent Literature 1: Japanese Patent Application Laid-open No. 2018-190332

SUMMARY

Technical Problem

However, an application processor needs to perform an enormous amount of information processing in order to recognize a subject from an input image by using a neural network.

Thus, the present disclosure proposes an information processing device, an information processing method, and an information processing program capable of reducing an information processing amount of the application processor that recognizes a subject from an input image.

Solution to Problem

According to the present disclosure, an information processing device is provided. The information processing device includes an acquisition unit, a generation unit, and an output unit. From an imaging unit that captures an image and generates image data, the acquisition unit acquires the image data. The generation unit generates, from the image data acquired by the acquisition unit, metadata to assist an application processor that executes processing related to the image. The output unit outputs the metadata generated by the generation unit to the application processor.

DESCRIPTION OF EMBODIMENTS

Hereinafter, embodiments of the present disclosure will be described in detail on the basis of the drawings. Note that in the following embodiments, overlapped description is omitted by assignment of the same reference sign to identical parts.

1. Configuration of Imaging Device

Figure 1:
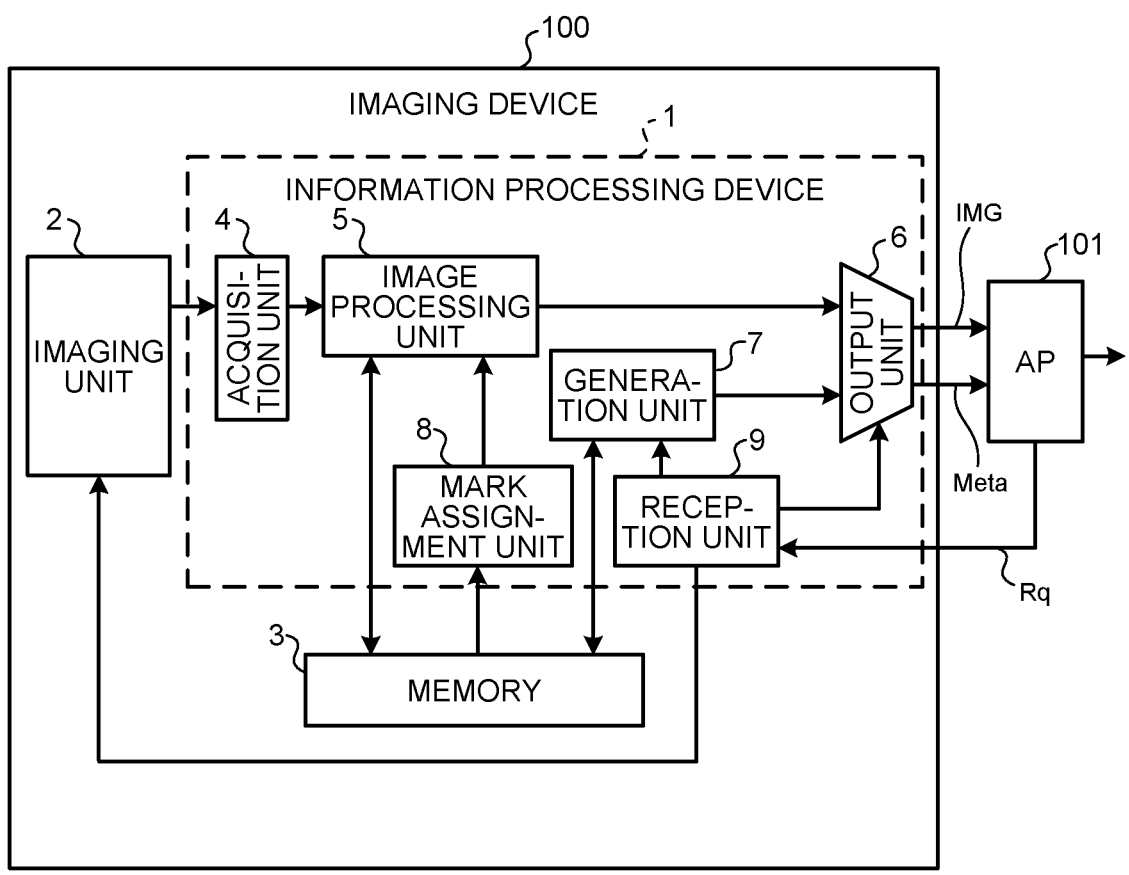
FIG. 1 is a view illustrating a configuration example of an imaging device in which an information processing device according to the present disclosure is provided.

FIG. 1 is a view illustrating a configuration example of an imaging device 100 in which an information processing device 1 according to the present disclosure is provided. As illustrated in FIG. 1, the imaging device 100 includes the information processing device 1, an imaging unit 2, and a memory 3.

The imaging unit 2 includes a plurality of imaging pixels arrayed two-dimensionally, and captures an image by exposing each of the imaging pixels to light. The imaging unit 2 generates image data by photoelectrically converting light from a subject, which light is received by each of the imaging pixels, into signal charges corresponding to an amount of the received light, and by performing analog-digital conversion of an analog pixel signal corresponding to the signal charges into a digital pixel signal. The imaging unit 2 outputs the image data of the captured image to the information processing device 1. The memory 3 temporarily stores image data input from the imaging unit 2 via the information processing device 1.

The information processing device 1 includes, for example, a microcomputer including a central processing unit (CPU), a read only memory (ROM), a random access memory (RAM), and the like, and various circuits.

The information processing device 1 includes an acquisition unit 4, an image processing unit 5, an output unit 6, a generation unit 7, a mark assignment unit 8, and a reception unit 9 that function when the CPU executes, while using the RAM as a work area, an information processing program stored in the ROM.

Note that a part or all of the acquisition unit 4, the image processing unit 5, the output unit 6, the generation unit 7, the mark assignment unit 8, and the reception unit 9 included in the information processing device 1 may be configured by hardware such as an application specific integrated circuit (ASIC) or a field programmable gate array (FPGA).

The acquisition unit 4, the image processing unit 5, the output unit 6, the generation unit 7, the mark assignment unit 8, and the reception unit 9 included in the information processing device 1 respectively realize or execute actions of information processing described in the following. Note that an internal configuration of the information processing device 1 is not limited to the configuration illustrated in FIG. 1, and may be another configuration as long as being a configuration of performing the information processing described later.

The acquisition unit 4 acquires image data from the imaging unit 2 and performs an output thereof to the image processing unit 5. The image processing unit 5 performs general image processing on the image data. For example, the image processing unit 5 performs image processing such as defective pixel correction.

The image processing unit 5 outputs and stores the image data of after the image processing into the memory 3. Also, the image processing unit 5 outputs the image data of after the image processing to the output unit 6. The output unit 6 is, for example, a selector, and outputs one or both of image data IMG input from the image processing unit 5 and metadata Meta input from the generation unit 7 (described later) to an application processor (hereinafter, referred to as "AP 101").

The AP 101 is a processing unit that executes processing related to an image, which is captured by the imaging unit 2, by executing an application program. For example, the AP 101 executes processing of causing a display unit such as a liquid crystal display to display the image data IMG input from the imaging device 100.

Also, the AP 101 executes, for example, processing of recognizing a subject from the image data IMG input from the imaging device 100, processing of authenticating a subject therefrom, and the like. In a case of recognizing or authenticating the subject from the image data IMG, the AP 101 uses, for example, a machine learning model built by machine learning such as a deep neural network (DNN).

In a case of performing image recognition by using the DNN, the AP 101 converts the image data IMG input from the imaging device 100 into a data format of color signals of red (R), green (G), and blue (B), of a luminance signal (Y), a differential signal of a blue component (U), and a differential signal of a red component (V), or the like and performs the processing.

In this case, there is a possibility that performance is restricted by an interface between the imaging device 100 and the AP 101, a memory band on a side of the AP 101, and the like. Also, in order to improve recognition accuracy of the subject recognized from the image data IMG, the AP 101 requires very heavy processing and an information processing amount becomes enormous.

Thus, the generation unit 7 included in the information processing device 1 generates metadata Meta to assist the AP 101, and performs an output thereof to the output unit 6. The output unit 6 outputs one or both of the image data IMG and the metadata Meta to the AP 101 according to the information output from the AP 101. Thus, the AP 101 can reduce the information processing amount. Note that an example of the metadata Meta generated by the generation unit 7 will be described later with reference to FIG. 2 and FIG. 3.

The mark assignment unit 8 generates a watermark, which indicates a source of the image captured by the imaging unit 2 and which cannot be recognized by bare eyes, and performs an output thereof to the image processing unit 5, whereby the watermark is assigned to the image data IMG. For example, the mark assignment unit 8 assigns, to the image, a watermark in which a serial number of the imaging device 100 is associated with a date and place of capturing of the image.

Thus, for example, a user of the imaging device 100 can check, in a case where a captured image is illegally used for a purpose other than a purpose of himself/herself, whether the image is what is captured by himself/herself by analyzing a watermark assigned to the image with a predetermined image analysis device.

Also, in a case where the imaging device 100 is shared by a plurality of users, the mark assignment unit 8 assigns, to an image, a watermark capable of specifying a person who captures the image. For example, with respect to a date and place of capturing of an image, the mark assignment unit 8 associates a serial number of the imaging device 100 in a case where a first user captures the image, and associates a chip number unique to the imaging unit 2 in a case where a second user captures the image.

Also, the mark assignment unit 8 associates a chip number unique to the memory 3 in a case where a third user captures the image, and associates a chip number unique to the information processing device 1 in a case where a fourth user captures the image.

Thus, each of the plurality of users of the imaging device 100 can check whether an image is what is captured by himself/herself by analyzing a watermark assigned to the image with the predetermined image analysis device. Note that an example of the watermark assigned to the image by the mark assignment unit 8 will be described later with reference to FIG. 5.

The reception unit 9 receives a request from the AP 101, and outputs information corresponding to the request to the generation unit 7 or the imaging unit 2. The generation unit 7 generates metadata Meta corresponding to the request from the AP 101 which request is received by the reception unit 9.

For example, in a case where there is an information providing request for a position of a subject, a distance to the subject, an attribute of the subject, and the like from the AP 101, the reception unit 9 causes the generation unit 7 to generate metadata Meta including the information requested from the AP 101, for example.

Also, the reception unit 9 receives information related to a use of the AP 101 (type of information output from the AP 101) from the AP 101. Then, the reception unit 9 causes the output unit 6 to output one or both of the image data IMG and the metadata Meta to the AP 101 according to the use of the AP 101 which use is received from the AP 101. Note that the information output from the information processing device 1 to the AP 101 will be described later with reference to FIGS. 4A, 4B and FIG. 4C.

Also, in a case of receiving, from the AP 101, a request related to imaging control, the reception unit 9 outputs a control signal corresponding to the request related to the imaging control to the imaging unit 2, and sets the imaging unit 2 to perform the imaging control requested from the AP 101.

For example, in a case where high-resolution image data IMG is not necessary for information processing, the AP 101 outputs a request for lowering resolution of a captured image to the reception unit 9. In such a case, the reception unit 9 sets the imaging unit 2 in such a manner as to lower the resolution of the captured image.

Thus, since the low-resolution image data IMG having a small number of pixels is input from the output unit 6, the AP 101 can reduce a processing load as compared with a case of processing the high-resolution image data IMG having a large number of pixels.

Also, for example, in a case where color signals of red (R) and blue (B) among the color signals of red (R), green (G), and blue (B) are unnecessary for information processing, the AP 101 outputs an output request only for the color signal of green (G) to the reception unit 9. In such a case, the reception unit 9 sets the imaging unit 2 in such a manner as to output only the color signal of green (G). Note that the AP 101 may output an output request for a signal other than the color signal of green (G), such as the luminance signal (Y). In such a case, the reception unit 9 sets the imaging unit 2 in such a manner as to output a signal an output of which is requested from the AP 101.

Thus, since only the color signal of green (G) is input from the output unit 6 to the reception unit 9, the AP 101 can reduce the processing load as compared with a case of performing the information processing with respect to all of the color signals of red (R), green (G), and blue (B). Also, in a case where only the luminance signal (Y) is input from the imaging device 100, the AP 101 can similarly reduce the processing load.

Also, for example, in a case where image data IMG of a high frame rate is not necessary for information processing, the AP 101 outputs a request for lowering the frame rate to the reception unit 9. In such a case, the reception unit 9 sets the imaging unit 2 in such a manner as to lower the frame rate.

Thus, since the number of pieces of the image data IMG input within a predetermined time is decreased, the AP 101 can reduce the processing load as compared with a case where a large number of images of a high frame rate are input within the predetermined time.

2. Example of Metadata

Figure 2:
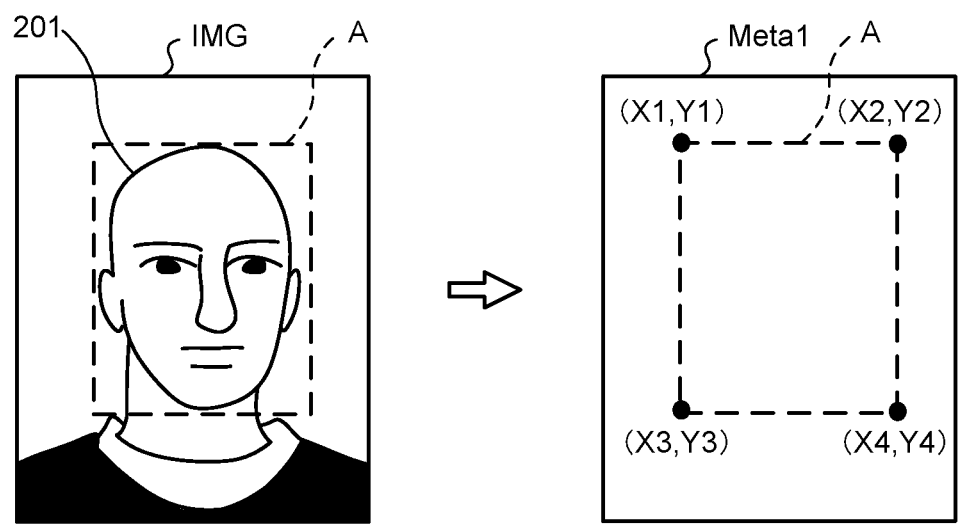
FIG. 2 is a view for describing an example of metadata according to the present disclosure.
Figure 3:
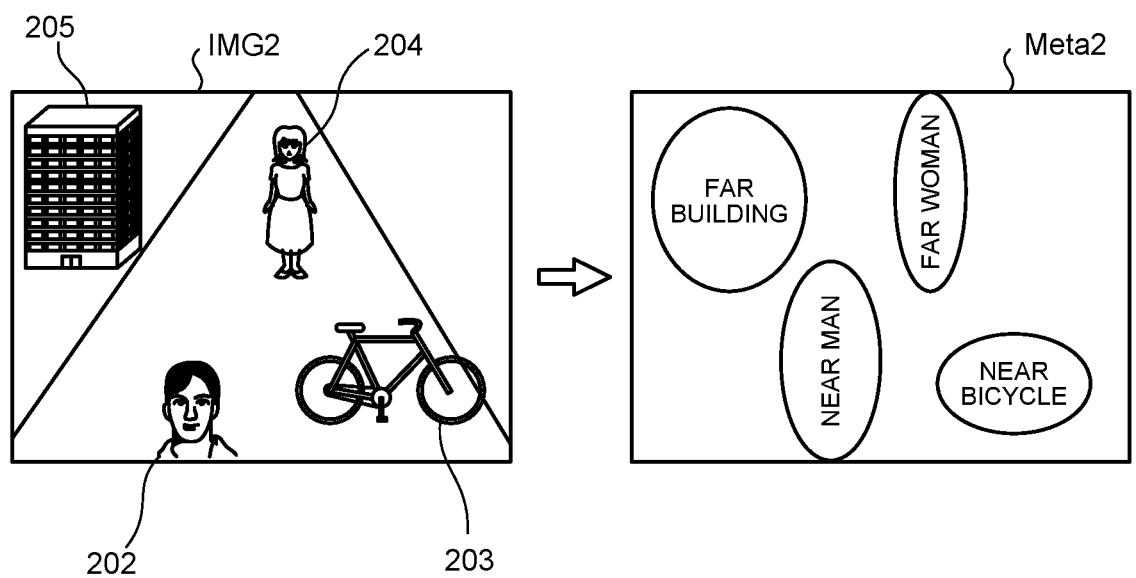
FIG. 3 is a view for describing an example of metadata according to the present disclosure.

Next, an example of the metadata Meta generated by the generation unit 7 will be described with reference to FIG. 2 and FIG. 3. FIG. 2 and FIG. 3 are views for describing an example of metadata according to the present disclosure.

As illustrated in FIG. 2, for example, in a case where image data IMG1 in which a person 201 is imaged is input, the generation unit 7 inputs the image data IMG1 to the DNN, extracts feature amount data indicating a feature of the image data IMG1, and generates metadata Meta1 from the feature amount data. Thus, the generation unit 7 can generate the accurate metadata Meta1 that assists the AP 101.

Specifically, the generation unit 7 specifies a position of a subject (here, person 201) in the image from the feature amount data, and generates the metadata Meta1 indicating the position of the subject. For example, the generation unit 7 generates, as the metadata Meta1, coordinates (X1, Y1), (X2, Y2), (X3, Y3), and (X4, Y4) of four corners of a rectangular frame A surrounding a region of a face of the person 201 in the image data IMG1, and performs an output thereof to the output unit 6.

For example, in a case where the AP 101 performs information processing of recognizing the face of the person 201 included in the image data IMG1, the output unit 6 outputs the image data IMG1 and the metadata Meta1 to the AP 101. Thus, by using the metadata Meta1, the AP 101 can reduce a processing load of recognizing the face of the person 201 included in the image data IMG1.

Specifically, in a case of recognizing the face of the person 201 from the image data IMG1 without using the metadata Meta1, the AP 101 needs to expand all pixels included in the image data IMG1 in a memory inside the AP 101, input information of all the pixels to the DNN, and then perform the information processing.

On the other hand, in a case where the metadata Meta1 is used, the AP 101 expands, in the memory inside the AP 101, only pixels in the rectangular frame A surrounding the region of the face of the person 201 in the image data IMG1, inputs information of the pixels in the rectangular frame A to the DNN, and recognizes the face of the person 201. Thus, the AP 101 can reduce the processing load since an information processing amount is decreased as compared with a case where the metadata Meta1 is not used.

Also, as illustrated in FIG. 3, for example, in a case where image data IMG2 in which a male person 202 and a bicycle 203 are in the vicinity and a female person 204 and a building 205 are in the distance is input, the generation unit 7 generates metadata Meta2.

For example, the generation unit 7 generates the metadata Meta2 including information of a near man, a near bicycle, a far woman, and a far building as information of subjects included in the image data IMG2, and performs an output thereof to the output unit 6. Note that the generation unit 7 can also generate the metadata Meta2 including information indicating a distance and direction to each of the persons 202 and 204, the bicycle 203, and the building 205, and perform an output thereof to the output unit 6.

In such a manner, the generation unit 7 generates the metadata Meta2 including information indicating the positions of the subjects, information indicating the attributes of the subjects, and information indicating the distances to the subjects, and performs an output thereof to the output unit 6. Thus, for example, in a case where the AP 101 is mounted on a vehicle and performs information processing of detecting an obstacle, a processing load can be reduced by exclusion of the far person 204 and the far building 205 from detection objects by utilization of the metadata Meta2.

Also, for example, in a case of outputting information that can be read from the image data IMG2, the AP 101 can output the number of men and women in the image, and the like by using the metadata Meta2 without performing processing of determining attributes of the subjects.

3. Information Output from Information Processing Device to AP

Figure 4A:
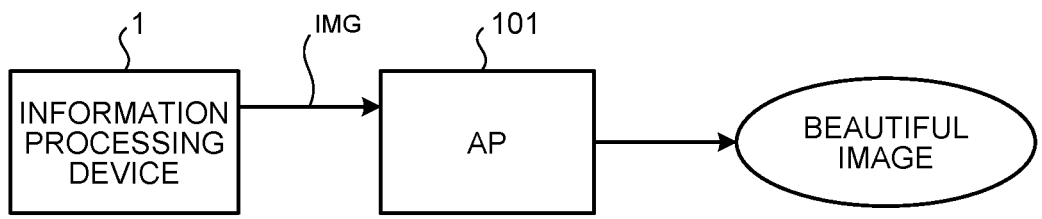
FIG. 4A is a view for describing information output to an AP from the information processing device according to the present disclosure.
Figure 4B:
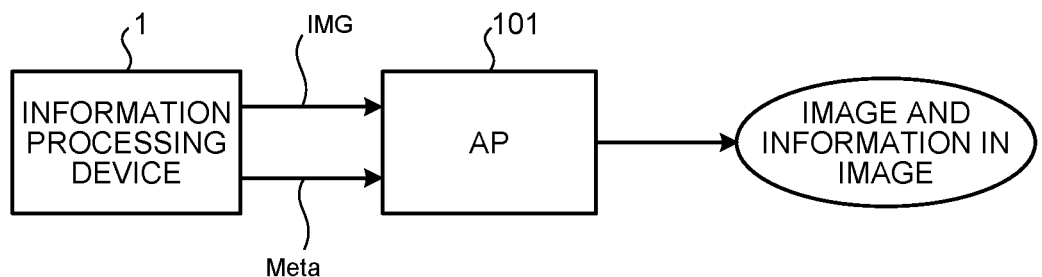
FIG. 4B is a view for describing information output to the AP from the information processing device according to the present disclosure.
Figure 4C:
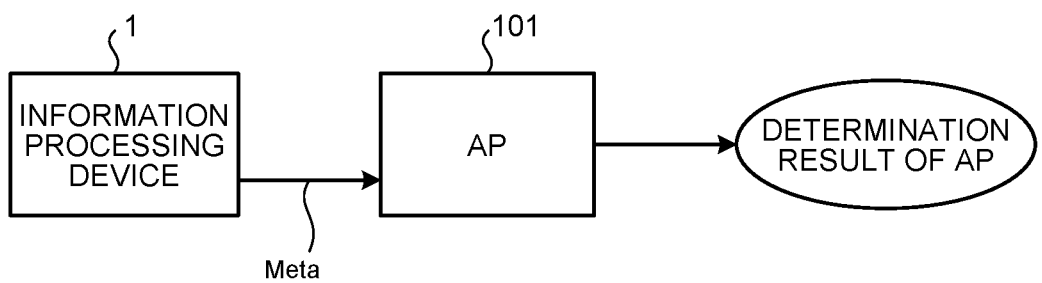
FIG. 4C is a view for describing information output to the AP from the information processing device according to the present disclosure.

Next, information output from the imaging device 100 to the AP 101 will be described with reference to FIGS. 4A, 4B and FIG. 4C. FIGS. 4A, 4B and FIG. 4C are views for describing information output to the AP from the information processing device according to the present disclosure.

The information processing device 1 outputs one or both of the image data IMG and the metadata Meta to the AP 101 according to the use of the AP 101 (type of information output from the AP 101). For example, as illustrated in FIG. 4A, in a case where the AP 101 is requested to output a beautiful image to be used for appreciation, the information processing device 1 outputs the image data IMG without outputting the metadata Meta to the AP 101.

Also, as illustrated in FIG. 4B, in a case where the AP 101 is requested to output an image and information in the image, the information processing device 1 outputs the image data IMG and the metadata Meta to the AP 101.

For example, the AP 101 may be requested to output an image of a whiteboard on which characters are written, and character information written on the whiteboard. In such a case, the information processing device 1 outputs, to the AP 101, the image data IMG in which the whiteboard is imaged, and meta information indicating a position where the character information is written on the whiteboard in the image data IMG.

Thus, the AP 101 can output an image in which the whiteboard is imaged and character information acquired by selective image recognition on the position where the character information is written on the whiteboard in the image data IMG.

Also, as illustrated in FIG. 4C, in a case where the AP 101 is requested to output a determination result by the AP 101, that is, in a case where an output of an image is not necessary, the information processing device 1 outputs the metadata Meta to the AP 101 without outputting the image data IMG.

For example, in a case where the AP 101 is requested to output a determination result of the number of people in an image, the information processing device 1 outputs metadata Meta indicating an attribute and a position of a subject in the image to the AP 101, for example. Thus, even when the image data IMG is not input from the information processing device 1, the AP 101 can determine the number of people in the image from the metadata Meta, and output the determination result.

4. Example of Watermark

Figure 5:
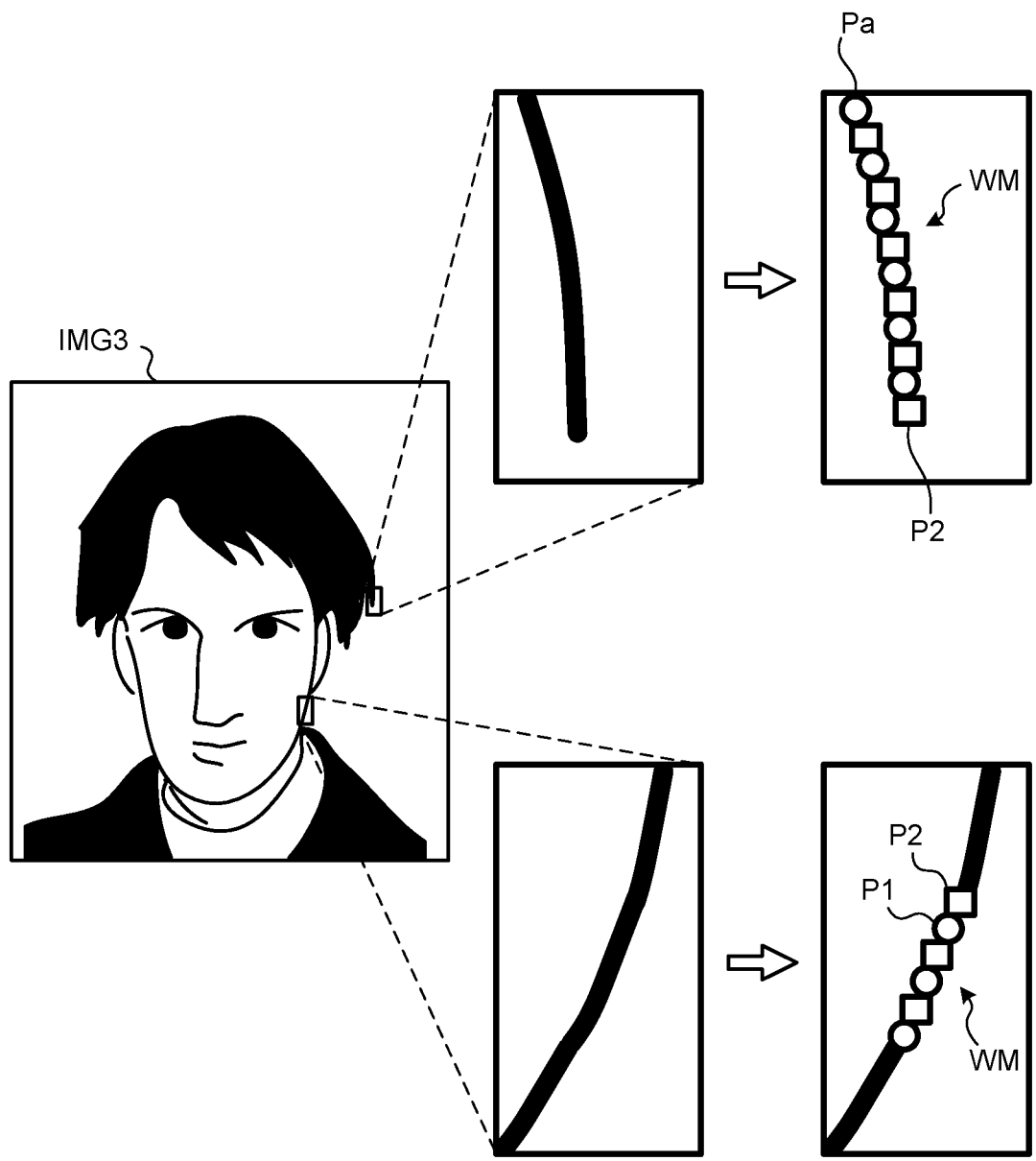
FIG. 5 is a view for describing an example of a watermark according to the present disclosure.

Next, an example of a watermark assigned to image data IMG by the mark assignment unit 8 will be described with reference to FIG. 5. FIG. 5 is a view for describing an example of a watermark according to the present disclosure.

As illustrated in FIG. 5, for example, in a case where image data IMG3 of an image in which a face of a person is imaged is read from the memory 3, the mark assignment unit 8 detects an edge of the image from the image data IMG3. Then, the mark assignment unit 8 detects a plurality of pixels which is included in the edge and in which color density is irregular.

In the example illustrated in FIG. 5, the mark assignment unit 8 detects a hair portion of a person and a cheek line portion of the person as the plurality of pixels which is included in the edge and in which the color density is irregular. Then, the mark assignment unit 8 assigns a watermark WM to the image data IMG3 by replacing the plurality of detected pixels having the irregular color density with a plurality of pixels P1 and P2 in which color density has a regular relationship indistinguishable to bare eyes.

In a pixel Pa indicated by a white circle in FIG. 5, the last digit of a value indicating a luminance value is an even number. Also, in a pixel Pb indicated by a white square in FIG. 5, the last digit of a value indicating the luminance value is an odd number. As described above, the watermark WM assigned by the mark assignment unit 8 is a pixel array in which an even number and an odd number of the last digit of the values indicating the luminance values regularly and alternately repeat.

Strictly speaking, the watermark WM locally has color density different from that of the original image data IMG3. However, the difference is not recognized by the bare eyes to the extent that the last digit of the values indicating the luminance values are changed. Thus, the mark assignment unit 8 can assign, to the image data IMG3, the watermark WM that cannot be recognized by the bare eyes.

Also, the mark assignment unit 8 assigns the watermark WM to a portion of a main subject such as a person, for example. Thus, the user of the imaging device 100 can check a source of the image by analyzing the watermark WM, for example, even in a case where the portion of the main subject in the captured image is illegally cut and combined with another image.

The mark assignment unit 8 can also assign the watermark WM to the entire image. Thus, the user of the imaging device 100 can check a source of the image by analyzing the watermark WM in a case where even a part of the captured image is processed against intention of himself/herself.

Furthermore, for example, the mark assignment unit 8 can also generate a watermark WM that disappears in a case where processing is performed until an original form of the subject in the image becomes unrecognizable to the bare eyes, and perform assignment thereof to the image data. Thus, the mark assignment unit 8 can prevent the source of the image processed until the original form becomes unrecognizable to the bare eyes from being specified by an analysis of the watermark WM.

5. Processing Executed by Information Processing Device

Figure 6:
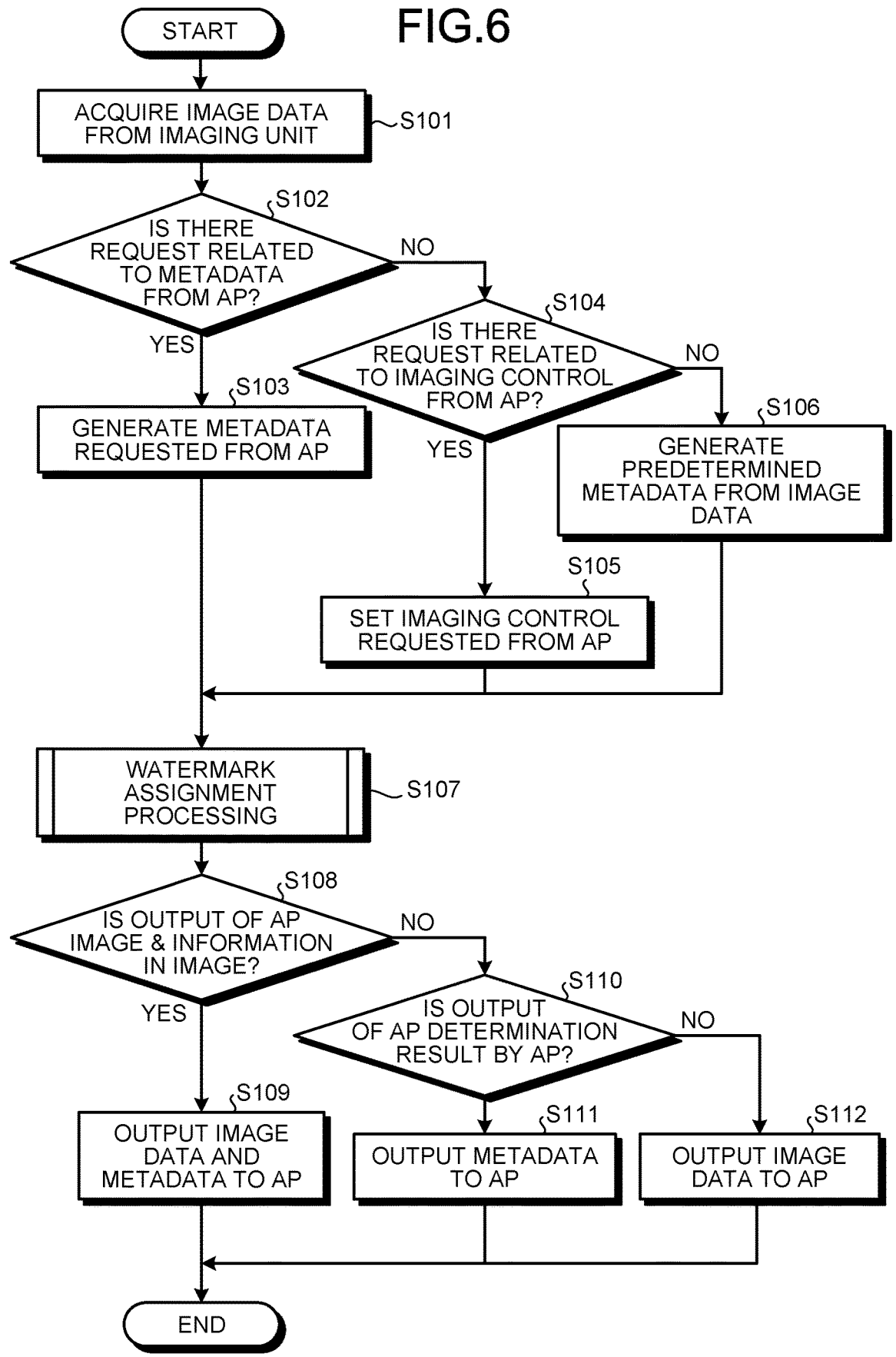
FIG. 6 is a flowchart illustrating an example of processing executed by the information processing device according to the present disclosure.
Figure 7:
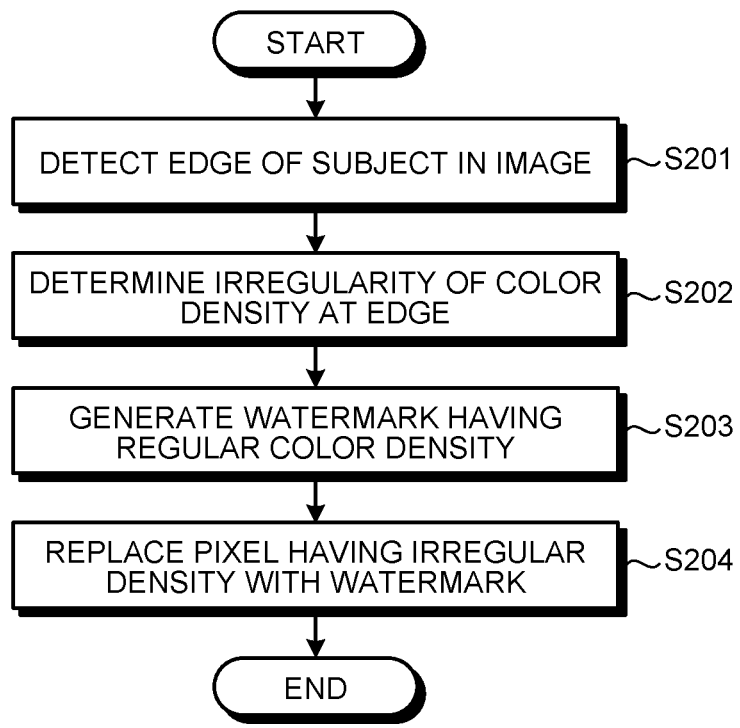
FIG. 7 is a flowchart illustrating an example of processing executed by the information processing device according to the present disclosure.

Next, processing executed by an information processing device according to an embodiment will be described with reference to FIG. 6 and FIG. 7. FIG. 6 and FIG. 7 are flowcharts illustrating an example of processing executed by the information processing device according to the present disclosure.

In a case where an image is captured by the imaging unit 2, the information processing device 1 executes the processing illustrated in FIG. 6 and FIG. 7. In a specific liquid, as illustrated in FIG. 6, when an image is captured by the imaging unit 2, the acquisition unit 4 first acquires image data from the imaging unit 2 (Step S101).

Subsequently, the reception unit 9 determines whether there is a request related to metadata from the AP 101 (Step S102). In a case of determining that there is the request related to the metadata from the AP 101 (Step S102, Yes), the reception unit 9 causes the generation unit 7 to generate the metadata requested from the AP 101 (Step S103), and causes the processing to transition to Step S107.

Also, in a case of determining that there is no request related to the metadata from the AP 101 (Step S102, No), the reception unit 9 determines whether there is a request related to imaging control from the AP 101 (Step S104).

In a case of determining that there is the request related to the imaging control from the AP 101 (Step S104, Yes), the reception unit 9 sets the imaging control requested from the AP 101 in the imaging unit 2 (Step S105), and causes the processing to transition to Step S107.

Also, in a case of determining that there is no request related to the imaging control from the AP 101 (Step S104, No), the reception unit 9 generates predetermined metadata from the image data (Step S106), and causes the processing to transition to Step S107.

In Step S107, the mark assignment unit 8 performs watermark assignment processing, and causes the processing to transition to Step S108. An example of the watermark assignment processing will be described later with reference to FIG. 7.

In a case of determining in Step S108 whether an output of the AP 101 is an image and information in the image and determining that the output is the image and the information in the image (Step S108, Yes), the reception unit 9 causes the output unit 6 to output the image data and the metadata to the AP 101, and ends the processing (Step S109).

Also, in a case of determining that the output of the AP 101 is not an image and information in the image (Step S108, No), the reception unit 9 determines whether the output of the AP 101 is a determination result by the AP 101 (Step S110).

In a case of determining that the output of the AP 101 is the determination result by the AP 101 (Step S110, Yes), the reception unit 9 causes the output unit 6 to output the metadata to the AP 101, and ends the processing (Step S111).

Also, in a case of determining that the output of the AP 101 is not the determination result by the AP 101 (Step S110, No), the reception unit 9 causes the output unit 6 to output the image data to the AP 101, and ends the processing (Step S112).

Next, an example of the watermark assignment processing performed by the mark assignment unit 8 in Step S107 will be described with reference to FIG. 7. As illustrated in FIG. 7, the mark assignment unit 8 first detects an edge of a subject in the image (Step S201).

Subsequently, the mark assignment unit 8 determines irregularity of color density at the edge (Step S202). Then, the mark assignment unit 8 generates a watermark having regular color density (Step S203).

Then, the mark assignment unit 8 assigns the watermark to the image data by replacing pixels having the irregular color density with the watermark (Step S204), and ends the watermark assignment processing.

6. Example of Application to Mobile Body

The technology according to the present disclosure (present technology) can be applied to various products. For example, the technology according to the present disclosure may be realized as a device mounted on any of mobile bodies such as an automobile, an electric vehicle, a hybrid electric vehicle, a motorcycle, a bicycle, a personal mobility device, an airplane, a drone, a ship, and a robot.

Figure 8:
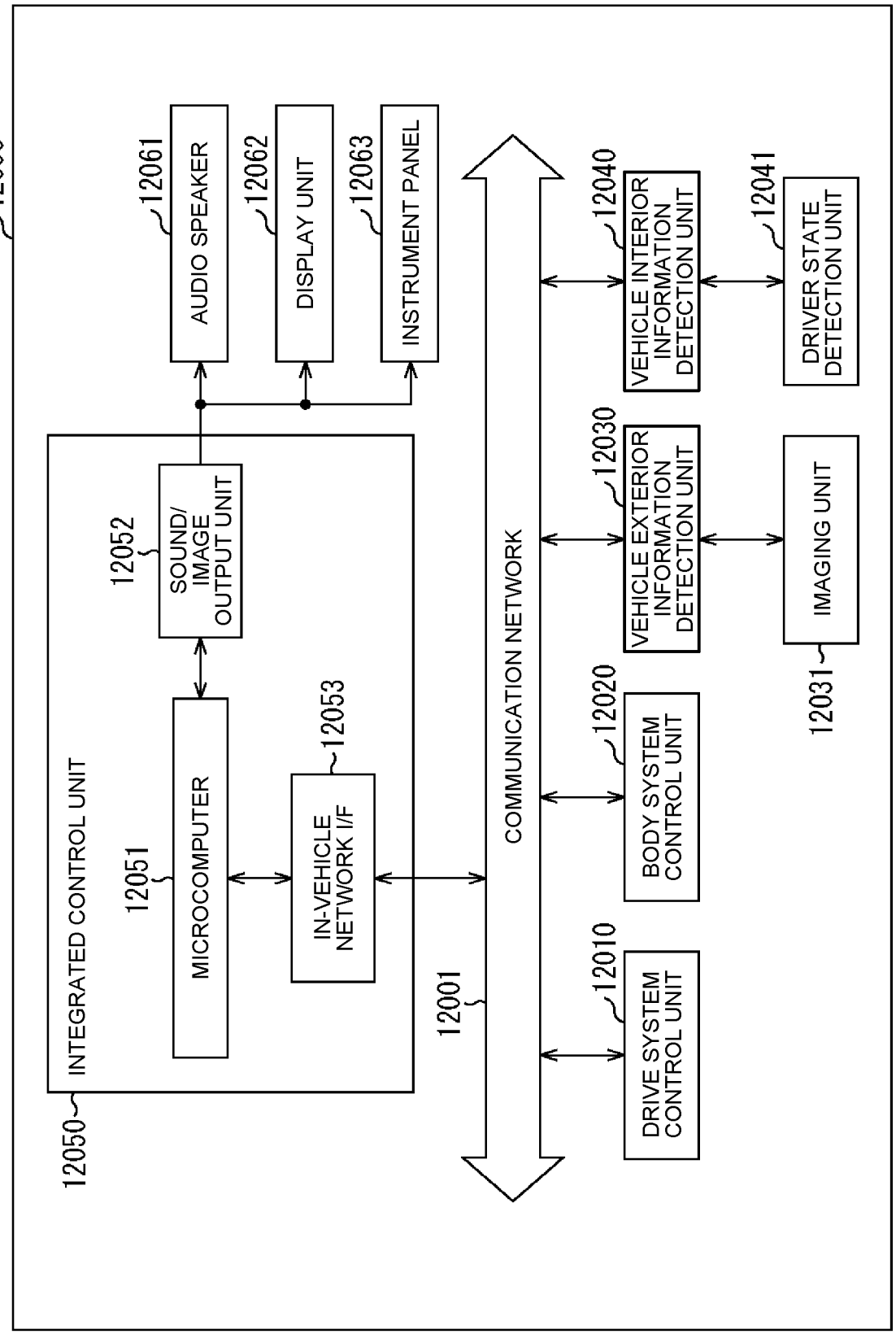
FIG. 8 is a block diagram illustrating an example of a schematic configuration of a vehicle control system.

FIG. 8 is a block diagram illustrating a schematic configuration example of a vehicle control system that is an example of a mobile body control system to which the technology according to the present disclosure can be applied.

A vehicle control system 12000 includes a plurality of electronic control units connected via a communication network 12001. In the example illustrated in FIG. 8, the vehicle control system 12000 includes a drive system control unit 12010, a body system control unit 12020, a vehicle exterior information detection unit 12030, a vehicle interior information detection unit 12040, and an integrated control unit 12050. Also, as a functional configuration of the integrated control unit 12050, a microcomputer 12051, a sound/image output unit 12052, and an in-vehicle network interface (I/F) 12053 are illustrated.

The drive system control unit 12010 controls operation of devices related to a drive system of a vehicle according to various programs. For example, the drive system control unit 12010 functions as a control device of a driving force generation device that is to generate driving force of a vehicle and that is an internal combustion engine, a driving motor, or the like, a driving force transmission mechanism to transmit the driving force to wheels, a steering mechanism to adjust a steering angle of the vehicle, a braking device to generate braking force of the vehicle, and the like.

The body system control unit 12020 controls operation of various devices mounted on a vehicle body according to various programs. For example, the body system control unit 12020 functions as a control device of a keyless entry system, a smart key system, a power window device, or various lights such as a headlight, a back light, a brake light, a blinker, or a fog light. In this case, radio waves transmitted from a portable machine that substitutes for a key, or signals of various switches can be input to the body system control unit 12020. The body system control unit 12020 receives an input of these radio waves or signals, and controls a door lock device, the power window device, the lights, and the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing with respect to a person, a vehicle, an obstacle, a sign, a character on a road surface, or the like on the basis of the received image.

The imaging unit 12031 is an optical sensor that receives light and outputs an electric signal corresponding to an amount of the received light. The imaging unit 12031 can output the electric signal as an image or as distance measurement information. Also, the light received by the imaging unit 12031 may be visible light, or may be invisible light such as infrared rays.

The vehicle interior information detection unit 12040 detects information inside the vehicle. For example, a driver state detection unit 12041 that detects a state of a driver is connected to the vehicle interior information detection unit 12040. The driver state detection unit 12041 includes, for example, a camera that images the driver, and the vehicle interior information detection unit 12040 may calculate a degree of fatigue or a degree of concentration of the driver or may determine whether the driver is dozing off on the basis of detected information input from the driver state detection unit 12041.

The microcomputer 12051 can calculate a control target value of the driving force generation device, the steering mechanism, or the braking device on the basis of the information inside/outside the vehicle which information is acquired by the vehicle exterior information detection unit 12030 or the vehicle interior information detection unit 12040, and can output a control command to the drive system control unit 12010. For example, the microcomputer 12051 can perform cooperative control to realize functions of an advanced driver assistance system (ADAS) including collision avoidance or shock mitigation of the vehicle, follow-up traveling based on an inter-vehicle distance, vehicle speed maintaining traveling, a collision warning of the vehicle, a lane departure warning of the vehicle, or the like.

Also, the microcomputer 12051 can perform cooperative control for autonomous driving or the like, in which traveling is performed autonomously without operation by the driver, by controlling the driving force generation device, the steering mechanism, the braking device, or the like on the basis of the information around the vehicle which information is acquired by the vehicle exterior information detection unit 12030 or the vehicle interior information detection unit 12040.

Also, the microcomputer 12051 can output a control command to the body system control unit 12020 on the basis of the information outside the vehicle which information is acquired by the vehicle exterior information detection unit 12030. For example, the microcomputer 12051 can perform cooperative control to prevent glare, such as switching a high beam to a low beam, by controlling the headlight according to a position of a preceding vehicle or an oncoming vehicle detected by the vehicle exterior information detection unit 12030.

The sound/image output unit 12052 transmits an output signal of at least one of sound and an image to an output device capable of visually or aurally notifying an occupant of the vehicle or the outside of the vehicle of information. In the example of FIG. 8, an audio speaker 12061, a display unit 12062, and an instrument panel 12063 are illustrated as examples of the output device. The display unit 12062 may include, for example, at least one of an on-board display and a head-up display.

Figure 9:
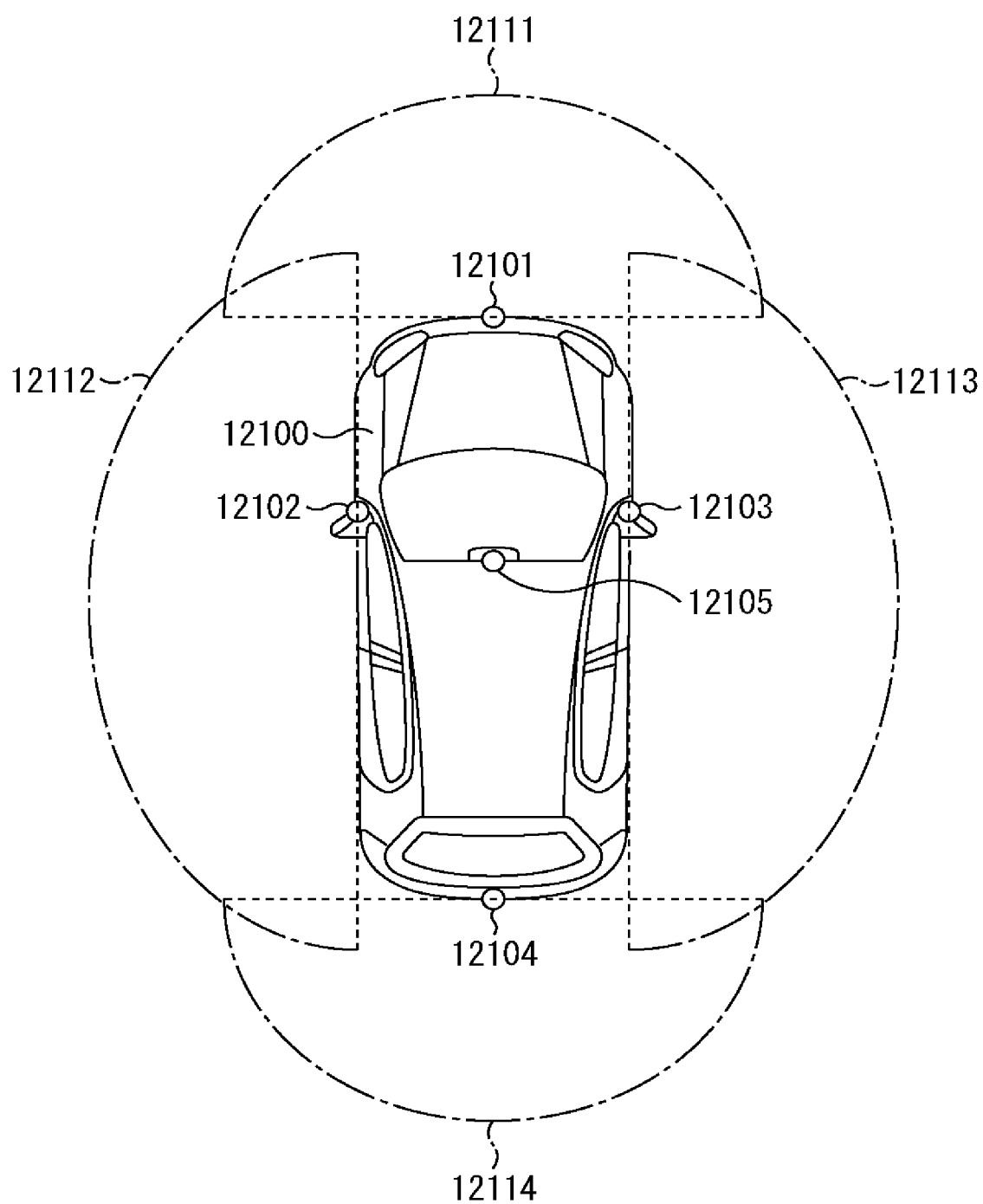
FIG. 9 is a view for describing an example of installation positions of a vehicle exterior information detection unit and an imaging unit.

FIG. 9 is a view illustrating an example of an installation position of the imaging unit 12031.

In FIG. 9, the vehicle 12100 includes imaging units 12101, 12102, 12103, 12104, and 12105 as the imaging unit 12031.

The imaging units 12101, 12102, 12103, 12104, and 12105 are respectively provided, for example, at positions such as a front nose, a side mirror, a rear bumper, a rear door, and an upper portion of a windshield in the vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of the sides of the vehicle 12100. The imaging unit 12104 provided at the rear bumper or the rear door mainly acquires an image behind the vehicle 12100. The front images acquired by the imaging units 12101 and 12105 are mainly used to detect a preceding vehicle, a pedestrian, an obstacle, a traffic light, a traffic sign, a lane, or the like.

Note that an example of shooting ranges of the imaging units 12101 to 12104 are illustrated in FIG. 9. An imaging range 12111 indicates an imaging range of the imaging unit 12101 provided at the front nose, imaging ranges 12112 and 12113 indicate imaging ranges of the imaging units 12102 and 12103 provided at the side mirrors respectively, and an imaging range 12114 indicates an imaging range of the imaging unit 12104 provided at the rear bumper or the rear door. For example, by superimposition of image data captured by the imaging units 12101 to 12104, an overhead image of the vehicle 12100 viewed from above is acquired.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, by acquiring a distance to each three-dimensional object in the imaging ranges 12111 to 12114 and a temporal change of this distance (relative speed with respect to the vehicle 12100) on the basis of the distance information acquired from the imaging units 12101 to 12104, the microcomputer 12051 can extract, as a preceding vehicle, a three-dimensional object that travels at a predetermined speed (such as 0 km/h or higher) in substantially the same direction as the vehicle 12100 and that is specifically the closest three-dimensional object on a traveling path of the vehicle 12100. Furthermore, the microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control for autonomous driving or the like in which traveling is performed autonomously without depending on operation of the driver.

For example, on the basis of the distance information acquired from the imaging units 12101 to 12104, the microcomputer 12051 can classify three-dimensional object data related to three-dimensional objects into a two-wheeled vehicle, a standard-sized vehicle, a large-size vehicle, a pedestrian, and other three-dimensional objects such as a utility pole, perform extraction thereof, and make use thereof for automatic avoidance of obstacles. For example, the microcomputer 12051 distinguishes obstacles around the vehicle 12100 between obstacles that can be visually recognized by the driver of the vehicle 12100 and obstacles that are hardly recognized visually. Then, the microcomputer 12051 determines a collision risk indicating a risk of collision with each obstacle. When the collision risk is equal to or higher than a set value and there is a possibility of the collision, it is possible to perform driving assistance for collision avoidance by outputting an alarm to the driver via the audio speaker 12061 or the display unit 12062, or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether there is the pedestrian in the captured images of the imaging units 12101 to 12104. Such pedestrian recognition is performed by, for example, a procedure of extracting feature points in the images captured by the imaging units 12101 to 12104 as the infrared cameras, and a procedure of performing pattern matching processing on a series of feature points that indicates an outline of an object and determining whether the object is a pedestrian. When the microcomputer 12051 determines that a pedestrian is present in the captured images of the imaging units 12101 to 12104 and recognizes the pedestrian, the sound/image output unit 12052 controls the display unit 12062 to superimpose and display a square outline for emphasis on the recognized pedestrian. Also, the sound/image output unit 12052 may control the display unit 12062 to display an icon or the like indicating the pedestrian at a desired position.

An example of the vehicle control system to which the technology according to the present disclosure can be applied has been described above. The technology according to the present disclosure can be applied to, for example, the imaging unit 12031 and the like among the configurations described above. For example, the imaging device 100 in FIG. 1 can be applied to the imaging unit 12031. By applying the technology according to the present disclosure to the imaging unit 12031, it is possible to reduce a processing load necessary for detection processing of vehicle exterior information by the vehicle exterior information detection unit 12030.

7. Effect

The information processing device 1 includes the acquisition unit 4, the generation unit 7, and the output unit 6.

From the imaging unit 2 that captures an image and generates image data, the acquisition unit 4 acquires the image data. The generation unit 7 generates, from the image data acquired by the acquisition unit 4, metadata Meta to assist the AP 101 that executes processing related to the image. The output unit 6 outputs the metadata Meta generated by the generation unit 7 to the AP 101. Thus, the information processing device 1 can reduce an information processing amount of the AP 101 that recognizes a subject from the input image.

Also, the generation unit 7 extracts feature data indicating a feature of the image from the image data by using a machine learning model, and generates metadata Meta from the feature data. Thus, the generation unit 7 can generate accurate metadata Meta1 that assists the AP 101.

Also, the generation unit 7 generates the metadata Meta1 indicating a position of the subject in the image. Thus, in a case of performing recognition processing of the subject, the AP 101 can recognize the subject while reducing a processing load by selectively performing the recognition processing on a region where the subject is present in the image by using the metadata Meta1.

Also, the generation unit 7 generates metadata Meta2 indicating an attribute of the subject in the image. Thus, for example, in a case where the AP 101 performs the recognition processing of the subject, the processing load can be reduced since processing of determining the attribute of the subject can be omitted by utilization of the metadata Meta2.

Also, the generation unit 7 generates the metadata Meta2 indicating a distance to the subject in the image. Thus, for example, in a case where the AP 101 is mounted on a vehicle and performs information processing of detecting an obstacle, it is possible to reduce the processing load by excluding a far subject from detection objects by using the metadata Meta2.

Also, the information processing device 1 further includes the reception unit 9 that receives a request from the AP 101. The generation unit 7 generates metadata Meta corresponding to the request received by the reception unit 9. Thus, the information processing device 1 can output more useful metadata Meta to the AP 101 in the information processing performed by the AP 101.

Also, the reception unit 9 outputs a control signal corresponding to a request related to imaging control and received from the AP 101 to the imaging unit 2 that captures an image and generates image data. Thus, the information processing device 1 can output image data IMG of the minimum necessary amount of information to the AP 101 in the information processing performed by the AP 101, for example.

Also, the information processing device 1 further includes the mark assignment unit 8 that generates watermarks WM1 and WM2 and that performs assignment thereof to the image data, the watermarks WM1 and WM2 indicating a source of the image and being unrecognizable to bare eyes. Thus, the information processing device 1 can assign the watermarks WM to image data IMG3 without impairing an appearance of the image.

Also, the mark assignment unit 8 detects an edge of the subject in the image, and assigns the watermarks WM to the image data by replacing a plurality of pixels, which is included in the edge and which has irregular color density, with a plurality of pixels in which color density has a regular relationship indistinguishable to the bare eyes. Thus, as a result, the watermarks WM that cannot be recognized by the bare eyes can be assigned to the image data IMG3.

Also, the mark assignment unit 8 assigns the watermarks WM to the entire image. Thus, the user of the imaging device 100 can check a source of the image by analyzing the watermarks WM in a case where even a part of the captured image is processed against intention of himself/herself.

Also, the mark assignment unit 8 assigns the watermarks WM to a portion of a main subject in the image. Thus, the user of the imaging device 100 can check a source of the image by analyzing the watermarks WM, for example, even in a case where the portion of the main subject in the captured image is illegally cut and combined with another image.

Also, the mark assignment unit 8 generates a watermark WM that disappears in a case where processing is performed until an original form of the subject in the image becomes unrecognizable to the bare eyes. Thus, the information processing device 1 can prevent the source of the image processed until the original form becomes unrecognizable to the bare eyes from being specified by an analysis of the watermark.

Also, an information processing method includes acquiring image data from the imaging unit 2 that captures an image and generates the image data, generating, from the image data, metadata Meta to assist an application processor that executes processing related to the image, and outputting the metadata Meta to the AP 101, the acquiring, generating, and outputting being performed by a computer. Thus, according to the information processing method of the present disclosure, it is possible to reduce an information processing amount of the AP 101 that recognizes a subject from the input image.

Also, an information processing program causes the computer to function as the acquisition unit 4, the generation unit 7, and the output unit 6. From the imaging unit 2 that captures an image and generates image data, the acquisition unit 4 acquires the image data. The generation unit 7 generates, from the image data acquired by the acquisition unit 4, metadata Meta to assist the AP 101 that executes processing related to the image. The output unit 6 outputs the metadata Meta generated by the generation unit 7 to the AP 101. Thus, according to the information processing program of the present disclosure, it is possible to reduce an information processing amount of the AP 101 that recognizes a subject from the input image.

Note that the effects described in the present description are merely examples and are not limitations, and there may be a different effect.

Note that the present technology can also have the following configurations.

(1)

An information processing device including:

an acquisition unit that acquires image data from an imaging unit that captures an image and generates the image data;

a generation unit that generates, from the image data acquired by the acquisition unit, metadata to assist an application processor that executes processing related to the image; and an output unit that outputs the metadata generated by the generation unit to the application processor.

(2)
The information processing device according to (1), wherein
the generation unit
extracts feature data indicating a feature of the image from the image data by using a machine learning model, and generates the metadata from the feature data.

(3)
The information processing device according to (1) or (2), wherein
the generation unit
generates the metadata indicating a position of a subject in the image.

(4)
The information processing device according to any one of (1) to (3), wherein
the generation unit
generates the metadata indicating an attribute of a subject in the image.

(5)
The information processing device according to any one of (1) to (4), wherein
the generation unit
generates the metadata indicating a distance to a subject in the image.

(6)
The information processing device according to any one of (1) to (5), further including
a reception unit that receives a request from the application processor, wherein
the generation unit
generates the metadata corresponding to the request received by the reception unit.

(7)
The information processing device according to (6), wherein
the reception unit
outputs a control signal corresponding to the request, which is related to imaging control and received from the application processor, to the imaging unit that captures the image and generates the image data.

(8)
The information processing device according to any one of (1) to (7), further including
a mark assignment unit that generates a watermark indicating a source of the image and being unrecognizable to a bare eye, and performs assignment thereof to the image data.

(9)
The information processing device according to (8), wherein
the mark assignment unit
detects an edge of a subject in the image, and assigns the watermark to the image data by replacing a plurality of pixels, which is included in the edge and which has irregular color density, with a plurality of pixels in which color density has a regular relationship indistinguishable to the bare eye.

(10)
The information processing device according to (8) or (9), wherein
the mark assignment unit
assigns the watermark to the entire image.

(11)
The information processing device according to any one of (8) to (10), wherein
the mark assignment unit
assigns the watermark to a portion of a main subject in the image.

(12)
The information processing device according to any one of (8) to (11), wherein
the mark assignment unit
generates the watermark that disappears in a case where processing is performed until an original form of the subject in the image becomes unrecognizable to the bare eye.

(13)
An information processing method including:
acquiring image data from an imaging unit that captures an image and generates the image data;
generating, from the image data, metadata to assist an application processor that executes processing related to the image; and
outputting the metadata to the application processor,
the acquiring, generating, and outputting being performed by a computer.

(14)
An information processing program for causing a computer to function as
an acquisition unit that acquires image data from an imaging unit that captures an image and generates the image data,
a generation unit that generates, from the image data acquired by the acquisition unit, metadata to assist an application processor that executes processing related to the image, and
an output unit that outputs the metadata generated by the generation unit to the application processor.

REFERENCE SIGNS LIST

1 INFORMATION PROCESSING DEVICE
2 IMAGING UNIT
3 MEMORY
4 ACQUISITION UNIT
5 IMAGE PROCESSING UNIT
6 OUTPUT UNIT
7 GENERATION UNIT
8 MARK ASSIGNMENT UNIT
9 RECEPTION UNIT
100 IMAGING DEVICE
101 AP

The invention claimed is:
1. An information processing device, comprising:
a central processing unit (CPU) configured to:
acquire image data of an image captured by an imaging unit, wherein the image includes a subject;
receive a request from an application processor that executes a first process related to the image, wherein the request is based on a type of the first process related to the image;
generate metadata from the acquired image data based on the received request, wherein the metadata corresponds to the type of the first process related to the image;
detect an edge of the subject in the image;
detect, in the edge, a first plurality of pixels having an irregular color density;
generate a watermark that includes a second plurality of pixels having a regular color density;
assign the watermark to the image data by replacement of the first plurality of pixels having the irregular color density with the second plurality of pixels having the regular color density; and output the metadata and the image data having the watermark to the application processor.

2. The information processing device according to claim 1, wherein the CPU is further configured to:

extract feature data from the image data based on a machine learning model, wherein the feature data indicates a feature of the image; and generate the metadata based on the feature data.

3. The information processing device according to claim 1, wherein the CPU is further configured to generate the metadata indicating a position of the subject in the image.

4. The information processing device according to claim 1, wherein the CPU is further configured to generate the metadata indicating an attribute of the subject in the image.

5. The information processing device according to claim 1, wherein the CPU is further configured to generate the metadata indicating a distance of the imaging unit to the subject in the image.

6. The information processing device according to claim 1, wherein the request received from the application processor is related to imaging control, and the CPU is further configured to output, to the imaging unit, a control signal corresponding to the request.

7. The information processing device according to claim 1, wherein the watermark indicates a source of the image, and the watermark is unrecognizable to a bare eye.

8. The information processing device according to claim 7, wherein the CPU is further configured to assign the watermark to an entirety of the image.

9. The information processing device according to claim 7, wherein the CPU is further configured to assign the watermark to a portion of a main subject in the image.

10. The information processing device according to claim 7, wherein the watermark disappears in a case where a second process is performed until an original form of the subject in the image becomes unrecognizable to the bare eye.

11. An information processing method, comprising:

acquiring image data of an image captured by an imaging unit, wherein the image includes a subject;

receiving a request from an application processor that executes a process related to the image, wherein the request is based on a type of the process related to the image;

generating metadata from the acquired image data based on the received request, wherein the metadata corresponds to the type of the process related to the image;

detecting an edge of the subject in the image;

detecting, in the edge, a first plurality of pixels having an irregular color density;

generating a watermark that includes a second plurality of pixels having a regular color density;

assigning the watermark to the image data by replacing the first plurality of pixels having the irregular color density with the second plurality of pixels having the regular color density; and outputting the metadata and the image data having the watermark to the application processor.

12. A non-transitory computer-readable medium having stored thereon, computer-executable instructions which, when executed by a computer, cause the computer to execute operations, the operations comprising:

acquiring image data of an image captured by an imaging unit, wherein the image includes a subject;

receiving a request from an application processor that executes a process related to the image, wherein the request is based on a type of the process related to the image;

generating metadata from the acquired image data based on the received request, wherein the metadata corresponds to the type of the process related to the image;

detecting an edge of the subject in the image;

detecting, in the edge, a first plurality of pixels having an irregular color density;

generating a watermark that includes a second plurality of pixels having a regular color density;

assigning the watermark to the image data by replacing the first plurality of pixels having the irregular color density with the second plurality of pixels having the regular color density; and outputting the metadata and the image data having the watermark to the application processor.

* * * * *